United States Patent [19]

Wang

[11] Patent Number: 4,770,311

[45] Date of Patent: Sep. 13, 1988

[54] OUTLET BOX

[76] Inventor: Paul W. Wang, No. 11, Lane 337, Chin Hua Road, Taichung, Taiwan

[21] Appl. No.: 132,802

[22] Filed: Dec. 14, 1987

[51] Int. Cl.⁴ ............................................... H02G 3/08
[52] U.S. Cl. ...................................... 220/3.3; 220/3.2
[58] Field of Search ........................... 220/3.2, 3.3, 3.5; 174/52 R, 53, 57, 58

[56] References Cited

U.S. PATENT DOCUMENTS

| | | | |
|---|---|---|---|
| 2,697,535 | 12/1954 | Olson | 220/3.2 |
| 3,083,856 | 4/1963 | Appleton | 220/3.2 |
| 4,438,859 | 3/1984 | Solek | 220/3.2 |

Primary Examiner—G. T. Hall
Attorney, Agent, or Firm—Bacon & Thomas

[57] ABSTRACT

A reinforced outlet box comprises an open box; two conjunction plates integral with the open box and extend toward each other, each of the conjunction plates is provided with a fixing hole; two L-shaped members, each having a head portion and a body portion. The head portion has a theaded hole, the body portion has two catch holes. The L-shaped member is fixed to the open box by attaching the head portion to the conjunction plate and fixing the body portion to a face of the open box which is adjacent to the conjunction plate by rivet.

3 Claims, 4 Drawing Sheets

OUTLET BOX

BACKGROUND OF THE INVENTION

The present invention relates primarily to outlet boxes, and in particular, to an outlet box which is designed to facilitate connection to a wiring system.

Outlet boxes of varying sizes and shapes are well-known in the art. In particular, certain of such known outlet boxes comprise a plurality of detachable circular cutouts set on one or more sides of the boxes serving as channels for access for wires. Typically, an electrical circuit is established from the surce of electrical energy through a wiring system to the outlet box set in the wall, floor or ceiling proximate to the location of the attended appliance, such as a lamp bulb, a television, a refrigerator, or the like.

The strength of the outlet box is often degraded due to its poor structure, thus resulting in the loosening or detachment of a socket structure. The situation becomes terrible when the outlet box is connected to a pendant, this might result in a hazard of falling of the pendant.

Efforts at improving such outlet boxes have been primarily addressed to the strength of the structures. The production of more strengthened outlet boxes have also been found to provide a more secure outlet box thereby extending the life of the device.

SUMMARY OF THE INVENTION

It is a primary object of the present invention to provide an outlet box having reinforced structure.

It is another object of the present invention to provide an outlet box which is capable of providing a more secure connection to wiring system and a longer life tern when in use.

These and other objects of the present invention, which may become obvious to those skilled in the art through the hereinafter detailed description of the invention, are achieved by an outlet box comprising: an open box; at least two conjunction plates integral with the open box and extend toward each other, each of the conjunction plates is provided with at least a fixing hole; at least two reinforcing means, each reinforcing means is an L-shaped single member having a head portion and a body portion, the head portion has at least a threaded hole; the body portion has at least two catch holes.

The reinforcing means is fixed to the open box by attaching the head portion to the conjunction plate and fixing the body portion to a face of the open box which is adjacent to the conjunction plate by rivet means.

DETAILED DESCRIPTION OF THE PREFERRED EMBODIMENT

Figure 1:
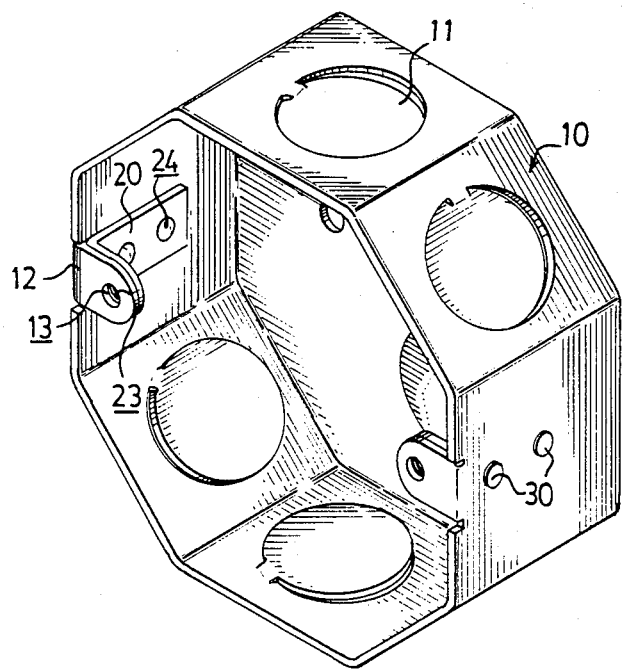
FIG. 1 is a perspective view of an outlet box in accordance with the present invention.

Referring to the drawings and initially to FIG. 1, it can be seen that an outlet box in accordance with the present invention comprises an open box 10 and a reinforcing means 20. The open box 10 is a conventional box structure which may be rectangular, hexagonal, or octagonal in longitudinal cross-section and having a plurality of circular cutouts 11 of varying sizes at each face thereof. These circular cutouts 11 are readily to be detached from the open box 10 and form a plurality of openings so as to facilitate connection to a wiring system. The outlet box in accordance with the present invention is characterized by having two integrally formed, diagonally positioned or sidewise correspondingly positioned conjunction plates 12 extend from the edges of the open box 10, and at least two rows of perforations are formed on the faces adjacent to the conjunction plates 12. Each of the conjunction plates 12 of the open box 10 are provided with a fixing hole 13.

Figure 2:
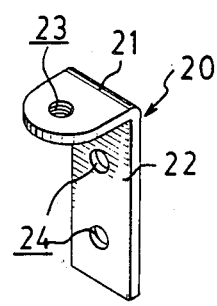
FIG. 2 is a perspective view of an L-shaped reinforcing means of the outlet box in accordance with the present invention.

Referring next to FIG. 2, the reinforcing means 20 is substantially an L-shaped single member having a head portion 21 and a body portion 22. The head portion 21 has a shape that matches the shape of the conjunction plate 12 of the open box 10 and includes a threaded hole 23 of a size slightly smaller than that of the fixing hole 13 of the conjunction plate 12. The body portion 22 is a plate having two catch holes 24 which mate with the perforations of the open box 10.

Figure 3:
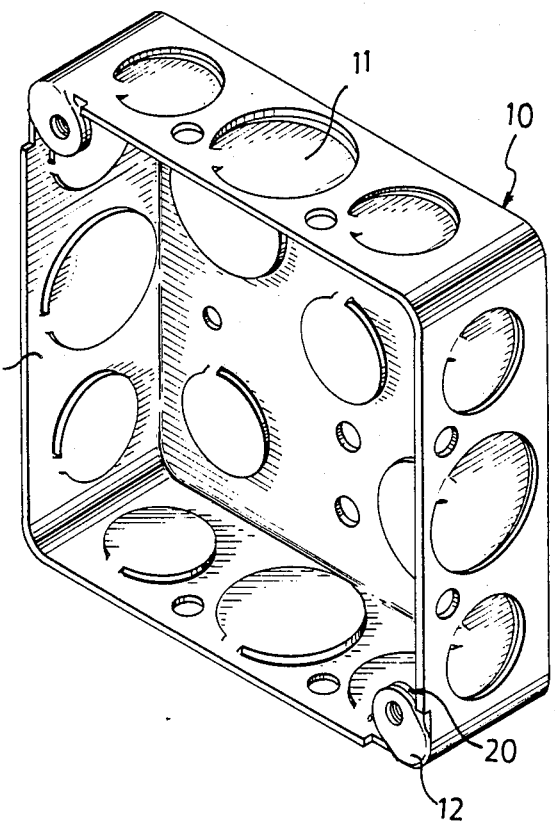
FIG. 3 is another preferred embodiment of the outlet box in accordance with the present invention.
Figure 4:
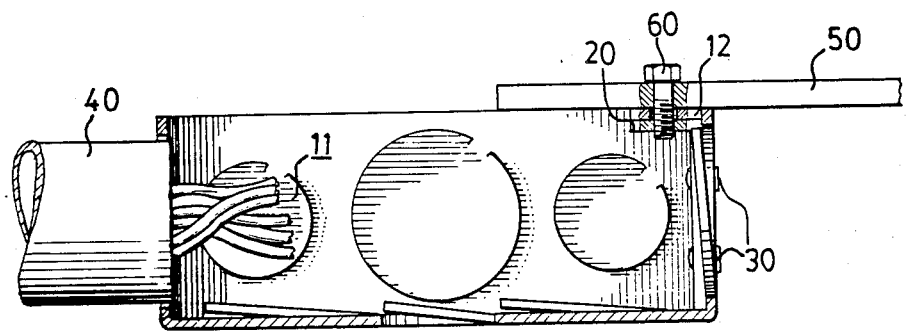
FIG. 4 is a transverse cross-sectional view of the outlet box, illustrating the utilization thereof.

In the preferred embodiments shown in FIGS. 1 and 3, the L-shaped reinforcing means 20 is fixed to the open box 10 which may be susceptible of numerous different physical configurations, such as a box of octagonal cross-section (see FIG. 1), a box of rectangular cross-section (see FIG. 3), etc., at any of the opposite sides of the edge of the open box 10 (see FIG. 1) or the corner of the open box 10 (see FIG. 4). In the embodiment depicted in FIG. 1, the L-shaped reinforcing means 20 is fixed to the open box 10 with the head portion 21 attached to the conjunction plate 12 and the body portion 22 disposed flat on the open box 10. The threaded hole 23 is in alignment with the fixing hole 13 of the conjunction plate 12. The catch holes 24 of the body portion 22 are in alignment with the perforations of the open box 10 so that rivets 30 may pass through. The outlet box having open box 10 and reinforcing means 20 fixed by rivets 30 provides a strong structure to prevent deformation thereof after intensive use.

With particular reference to FIG. 4, the manner in which the outlet box is used to connect a wiring system or an electrical system will now be described in detail.

First, wire 40 is located in the open box 10 through opening formed by detachment of one circular cutout 11, the open box 10 is in turn installed in a socket (not shown). The reinforcing means 20 is fixed to the open box 10 in the afore-mentioned manner. After that, a cover 50 is mounted on the outlet box with a screw 60 passing through the cover 50, the fixing hole 13 of the open box 10, and the threaded hole 23 of the reinforcing means 20, in sequence.

While the invention has been explained in relation to its preferred embodiments, it is to be understood that various modifications thereof will become apparent to those skilled in the art upon reading this specification. The invention disclosed herein is, therefore, intended to cover all such modifications as fall within the scope of the appended claims.

I claim:

1. An outlet box comprising:
    an open box having a plurality of circular cutouts of varying sizes at each face thereof;
    at least two conjunction plates integral with said open box and extending toward each other, each of said conjunction plates being provided with at least a fixing hole;

at least two reinforcing means, each reinforcing means being an L-shaped single member including a head portion and a body portion, said head portion having at least a threaded hole and being of a length such that the threaded hole thereof mates with said fixing hole of said conjunction plate; said body portion having at least two catch holes; and said reinforcing means being fixed to said open box by attaching said head portion to said conjunction plate and fixing said body portion to a face of said open box which is adjacent to said conjunction plate by rivet means.

2. The outlet box as claimed in claim 1, wherein said conjunction plates extend from any of two opposite sides of said open box.

3. The outlet box as claimed in claim 1, wherein said conjunction plates extend from any of two opposite corners of said open box.

* * * * *